United States Patent
Erickson et al.

(10) Patent No.: US 9,389,611 B2
(45) Date of Patent: Jul. 12, 2016

(54) ADAPTATIVE PLATFORM FOR UNMANNED DEFENSE VEHICLES

(75) Inventors: David Ryan Erickson, Dunmore (CA); Matthew WJ Ceh, Calgary (CA); Dale Anderson, Red Cliff (CA)

(73) Assignee: Her Majesty the Queen in Right of Canada as Represented by the Minister of National Defence, Ottawa (CA)

( * ) Notice: Subject to any disclaimer, the term of this patent is extended or adjusted under 35 U.S.C. 154(b) by 0 days.

(21) Appl. No.: 14/391,915

(22) PCT Filed: Apr. 11, 2012

(86) PCT No.: PCT/CA2012/000364
§ 371 (c)(1),
(2), (4) Date: Dec. 10, 2014

(87) PCT Pub. No.: WO2013/152414
PCT Pub. Date: Oct. 17, 2013

(65) Prior Publication Data
US 2015/0301527 A1    Oct. 22, 2015

(51) Int. Cl.
*B63G 1/00* (2006.01)
*B63G 8/00* (2006.01)
(Continued)

(52) U.S. Cl.
CPC ............. *G05D 1/0011* (2013.01); *B63G 13/00* (2013.01); *B63H 21/21* (2013.01); *B64C 39/024* (2013.01);
(Continued)

(58) Field of Classification Search
USPC .............. 701/2; 89/36.01, 36.02, 36.07, 36.8, 89/36.15, 36.17
See application file for complete search history.

(56) References Cited

U.S. PATENT DOCUMENTS

| 4,621,562 A | 11/1986 | Carr et al. |
| 2004/0168837 A1 | 9/2004 | Michaud et al. |

(Continued)

FOREIGN PATENT DOCUMENTS

WO  WO 2008060689   5/2008

OTHER PUBLICATIONS

International Search Report PCT/CA2012/000364.
(Continued)

*Primary Examiner* — Yonel Beaulieu
(74) *Attorney, Agent, or Firm* — Benoit & Cote Inc.

(57) ABSTRACT

A kit for building an adaptive unmanned CIED vehicle comprising a vehicle chassis having a locomotion system for moving the vehicle in an operating environment, and a controllable steering mechanism for steering the vehicle as it moves in the operating environment; one or more motors for coupling to the locomotion system to the controllable steering mechanism; a remote control unit for communication with and for controlling the one or more motors and the controllable steering mechanism; payload devices for performing tasks attributed to the vehicle; and a platform for providing the capability of adapting the vehicle to perform new tasks in view of evolution in the operating environment, the platform comprising: a casing for mounting on or in the vehicle chassis; a computing device for connection to a selection of payload devices from the payload devices, and a memory for storing computing instructions for controlling operation of the selection of payload devices; a power source for powering at least one of the payload devices; power ports connected to the power source; and data ports connected to the computing device for connecting at least one of the payload devices to the computing device; wherein the computing device, the power source, the power ports and the data ports are mounted to the casing and wherein the payload devices and the one or more motors are for mounting to either the vehicle chassis or the casing. The payload devices are plug and play devices and are connected to the platform using standardized military connectors.

19 Claims, 11 Drawing Sheets

(51) Int. Cl.
  *B63G 11/00* (2006.01)
  *G05D 1/00* (2006.01)
  *B63G 13/00* (2006.01)
  *F41H 7/00* (2006.01)
  *F41H 11/16* (2011.01)
  *G06Q 50/30* (2012.01)
  *B63H 21/21* (2006.01)
  *B64C 39/02* (2006.01)
  *F41H 11/00* (2006.01)
  *G06F 9/44* (2006.01)

(52) U.S. Cl.
  CPC ............... *F41H 7/005* (2013.01); *F41H 11/00* (2013.01); *F41H 11/16* (2013.01); *G06Q 50/30* (2013.01); *B63G 8/001* (2013.01); *B63G 2008/005* (2013.01); *B64C 2211/00* (2013.01); *G06F 9/4411* (2013.01)

(56) References Cited

U.S. PATENT DOCUMENTS

| | | | |
|---|---|---|---|
| 2004/0216932 A1* | 11/2004 | Giovanetti | B62D 55/065 180/9.1 |
| 2006/0237239 A1 | 10/2006 | Bruner et al. | |
| 2008/0017426 A1* | 1/2008 | Walters | B60F 3/003 180/89.1 |
| 2010/0275472 A1 | 11/2010 | Cunningham | |
| 2011/0190933 A1 | 8/2011 | Shein et al. | |
| 2011/0301786 A1 | 12/2011 | Allis et al. | |

OTHER PUBLICATIONS

IPRP-International Searching Authority, International Search Report, Jan. 25, 2013, 7p.

\* cited by examiner

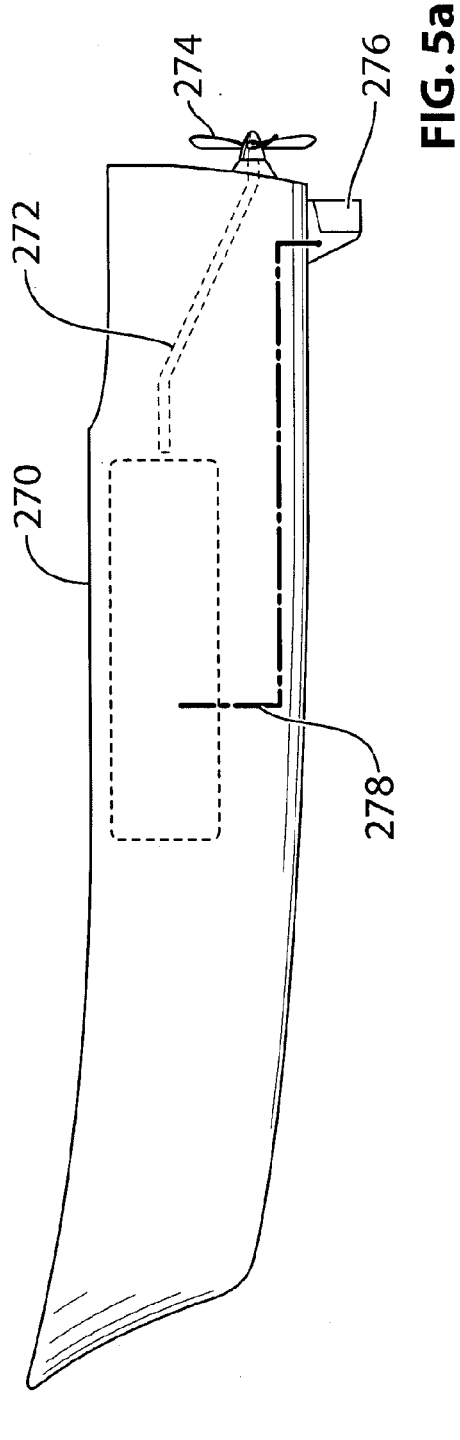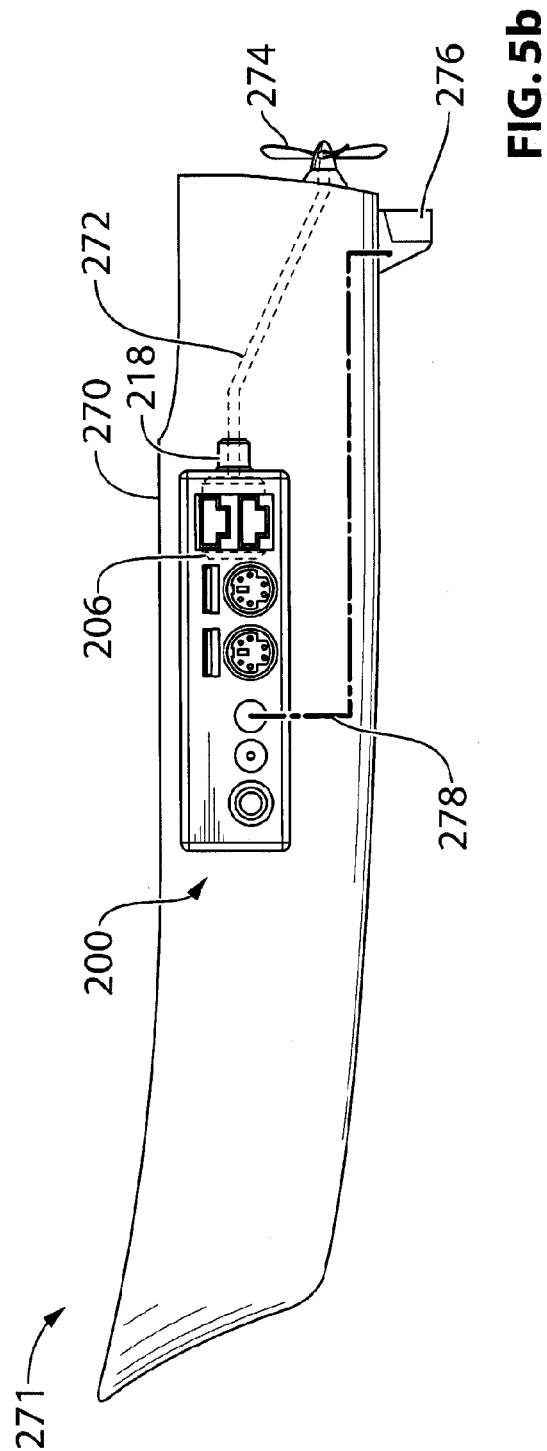

ADAPTATIVE PLATFORM FOR UNMANNED DEFENSE VEHICLES

BACKGROUND (a) Field

The subject matter disclosed generally relates to defense vehicles. More particularly, the subject matter relates to unmanned defense vehicles used in investigating Improvised Explosive Device (IED) threats.

(b) Related Prior Art

Unmanned defense vehicles have long been used in warfare for detecting and/or foiling threats. These vehicles consist of CIED robots (Counter Improvised Explosive Device robots) which are used to perform missions in areas which are too dangerous for soldiers; e.g., detecting mines, explosives, etc.

Like any engineered systems, CIED robots are designed based on a list of predefined requirements. The design is completed by sending finished versions of the CIED robot into the field, collecting feedback from the field, and then re-iterating the development to address the shortfalls and introduce new elements.

However, the very nature of the IED threats is that they are time-varying and constantly evolving. Therefore, it is not possible to have one design that suits all situations. Every time a new threat is detected the process of re-designing the CIED robots has to be repeated.

For example, if a new situation arises which requires mounting a rocket launcher on an unmanned ground vehicle which was not initially designed to have a rocket launcher thereon, the design of the unmanned vehicle has to be changed to introduce a bigger motor/engine, a bigger battery, a sufficient physical space on the chassis to mount the rocket launcher thereon, etc. These changes are substantial and require a re-design of the entire unit.

Accordingly, the process of re-designing unmanned vehicles is expensive, time consuming and impractical especially when the operations are being performed away from the home country. In which case, the CIED robot is sent back to the home country to be re-designed and sent back for testing, and possibly changed further, prior to being deployed in the field.

This approach complicates the operations and puts more lives at risk. Therefore, there is a need for a CIED platform which may be adapted to evolving situations without re-designing the whole robot system again.

SUMMARY

The present embodiments describe a novel approach in the design of CIED robots. In an embodiment, a CIED platform is provided which allows for adding new devices that were not conceived as part of the original device in a plug and play manner. In the novel design approach for CIED robots, instead of designing from a complete list of requirements (i.e., the system must meet all possible requirements in the list), the design work is objective-based with the systems evolving through evaluation and redesign incorporating user/operator/soldier feedback after deployment in the operating environment. Furthermore, this approach suggests that instead of a waterfall design cycle the project should function as a support to operations with re-design effort allocated throughout the life cycle of the project. In this way, improvements are never out of scope and the system can be adapted to changing IED designs and tactics.

According to an embodiment, there is provided a kit for building an adaptive unmanned defense vehicle (vehicle), the kit comprising:

a vehicle chassis comprising a locomotion system for moving the vehicle in an operating environment, and a controllable steering mechanism for steering the vehicle as it moves in the operating environment;

one or more motors for coupling to the locomotion system and to the controllable steering mechanism;

a remote control unit for communication with and for controlling the one or more motors and consequently the locomotion system and the controllable steering mechanism;

payload devices for performing tasks attributed to the vehicle; and a platform for providing the capability of adapting the vehicle to perform new tasks in view of evolution in the operating environment, the platform comprising:

a casing for mounting on or in the vehicle chassis;

a computing device for connection to a selection of payload devices from the payload devices, the computing device comprising a processor and a memory, the memory for storing computing instructions for controlling operation of the selection of payload devices, the processor having unused processing capacity and the memory having unused storage space for controlling operation of another selection of payload devices from the payload devices;

a power source for powering at least one of the payload devices;

power ports connected to the power source; and data ports connected to the computing device for connecting at least one of the payload devices to the computing device;

wherein the computing device, the power source, the power ports and the data ports are mounted to the casing and wherein the payload devices and the one or more motors are for mounting to either the vehicle chassis or the casing.

According to an aspect, the payload devices are plug and play devices.

According to an aspect, the kit further comprises a transceiver for establishing a communication link with a remote base for at least one of:

transmitting data gathered by either one of the payload devices;

receiving and installing upgrading/driver software for at least one of the computing device and the payload devices; and receiving instructions for execution by the computing device to enable and disable one or more of the payload devices.

According to an aspect, the memory is further for storing data gathered by either one of the payload devices.

According to an aspect, the kit further comprises a plurality of vehicle chassis of different types for building different types of vehicles as needed using a single platform, the vehicle chassis being adapted to receive and be operated by the platform in a plug and play manner.

According to an aspect, the plurality of vehicle chassis comprise at least two of:

a chassis for a ground vehicle, the locomotion system comprises a set of wheels or a set of tracks for rollably driving the vehicle on the ground;

a chassis for an airplane, the locomotion system comprising at least one turbine or blade for moving the airplane in the air;

a chassis for a boat, the locomotion system comprising at least one turbine for moving the boat on water; and a chassis for a submarine comprising a sonar transceiver for connecting to the computing device, the locomotion system comprises at least one turbine for moving the submarine in the water.

According to an aspect, the power source includes one or more of: a battery, an internal combustion engine, and a solar panel.

According to an aspect, the kit further comprises mechanical connectors on one or both of the vehicle chassis and the casing, the mechanical connectors shaped and dimensioned to provide a connection interface for the payload devices.

According to an aspect, the platform includes mechanical connectors comprising military mounting brackets, Picatinny Arsenal mounting rails, Weaver mounting rails, and MIL-STD-1913 rails.

According to an aspect, the data ports comprise wired data ports comprising one or more of: USB ports, PS/2 ports, Ethernet ports, CANbus ports, GIGA Ethernet ports, RS-232, RS-234, RS-488, IEEE 1394 Firewire ports, HDMI ports, VGA ports, and SVGA ports.

According to an aspect, the data ports comprise one or more wireless ports comprising Bluetooth ports, Infrared ports, wireless Ethernet ports, MiWi ports, Zigbee ports, and wireless mesh network ports.

According to an aspect, the payload devices include one or more of: capture device(s), lamp, bomb sniffer, automated rifle and/or rocket launcher, explosives connected to a self-destructing module, explosive sniffer, radar, auxiliary processor, auxiliary memory, sensors, actuators, lamps, robotic manipulators with end-effectors, detonators, stand-off neutralizer, grappling hook, dozer blade, communication re-broadcaster, ammunition carrier, trailer, communication cable spooler, trailer hitch, and motion detector.

According to an aspect, the remote control unit is wired or wireless.

According to another embodiment, there is provided a platform for mounting to a vehicle chassis forming part of an adaptive unmanned defense vehicle, the platform for providing the capability of adapting the vehicle to perform new tasks in view of evolution in an operating environment, the platform comprising:

a casing for mounting on or in the vehicle chassis;

a computing device for connection to a selection of payload devices from a list of payload devices, the computing device comprising a processor and a memory, the memory for storing computing instructions for controlling operation of the selection of payload devices, the processor having unused processing capacity and the memory having unused storage space for controlling operation of another selection of payload devices from the list of payload devices;

a power source for powering at least one of the payload devices;

power ports connected to the power source; and data ports connected to the computing device for connecting at least one of the payload devices to the computing device;

wherein the computing device, the power source, the power ports and the data ports are mounted to the casing and wherein the payload devices are for mounting to either the vehicle chassis or the casing.

According to another embodiment, there is provided a method for producing and modifying an unmanned defense vehicle (vehicle) that is adaptable to evolving requirements in view of evolving threats or mission requirements in an operating environment, the method comprising:

producing a vehicle having an initial set of capabilities/features and having mechanical connectors, power ports and data ports for interfacing with payload devices;

using the vehicle in the operating environment and gathering data on the operating environment;

using the gathered data to determine one or more task requirements;

comparing the initial set of capabilities/features with the one or more task requirements to determine whether there is a mismatch between the initial set of capabilities/features and each task requirement;

when a mismatch occurs, querying a database using unmatched task requirement, the database returning one or more design change proposals.

According to an aspect, the method further comprises using the one or more design change proposals for assembling a modification kit and then sending the modification kit to the operating environment.

According to an aspect, the modification kit comprises a modification to software in a computing device of the vehicle, and wherein the sending of the modification is performed over a communication network.

According to an aspect, the method further comprises installing and testing the modification kit in the operating environment.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIG. 5a is a side plan view of a vehicle casing of a boat for receiving the platform therein, FIG. 5b is a side plan view of a boat comprising the vehicle casing of FIG. 5a with the platform installed therein;

It will be noted that throughout the appended drawings, like features are identified by like reference numerals.

DETAILED DESCRIPTION

In embodiments presented herein there are disclosed an adaptive platform for building and controlling unmanned defense vehicles, and a kit comprising the platform. The platform is for installing in a vehicle chassis and/or a body which is adapted to receive the platform mechanically and electrically in a plug and play manner. The kit comprising the platform and one or more vehicle chassis and/or a bodies for different types of vehicles; e.g., airplane, car, boat, submarine, whereby different types of unmanned defense vehicles may be built as the needs require using a single platform by simply installing the platform in a new vehicle chassis and/or a body. The platform defines a casing including openings and/or mechanical connectors for receiving a plurality of additional devices for adapting the vehicle to perform tasks in an evolving environment. The openings and/or mechanical connectors for receiving a plurality of additional devices may also be provided on the various chassis and/or bodies. The devices being selected in accordance with the requirements of each task. The platform includes reserved power/energy and processing resources for operating the additional devices. The platform may also include controllable power ports for powering the additional devices and data ports for connecting the devices to the computing device, whereby the additional devices may be added and removed from the platform in a plug and play manner, as the needs dictate.

Figure 1:
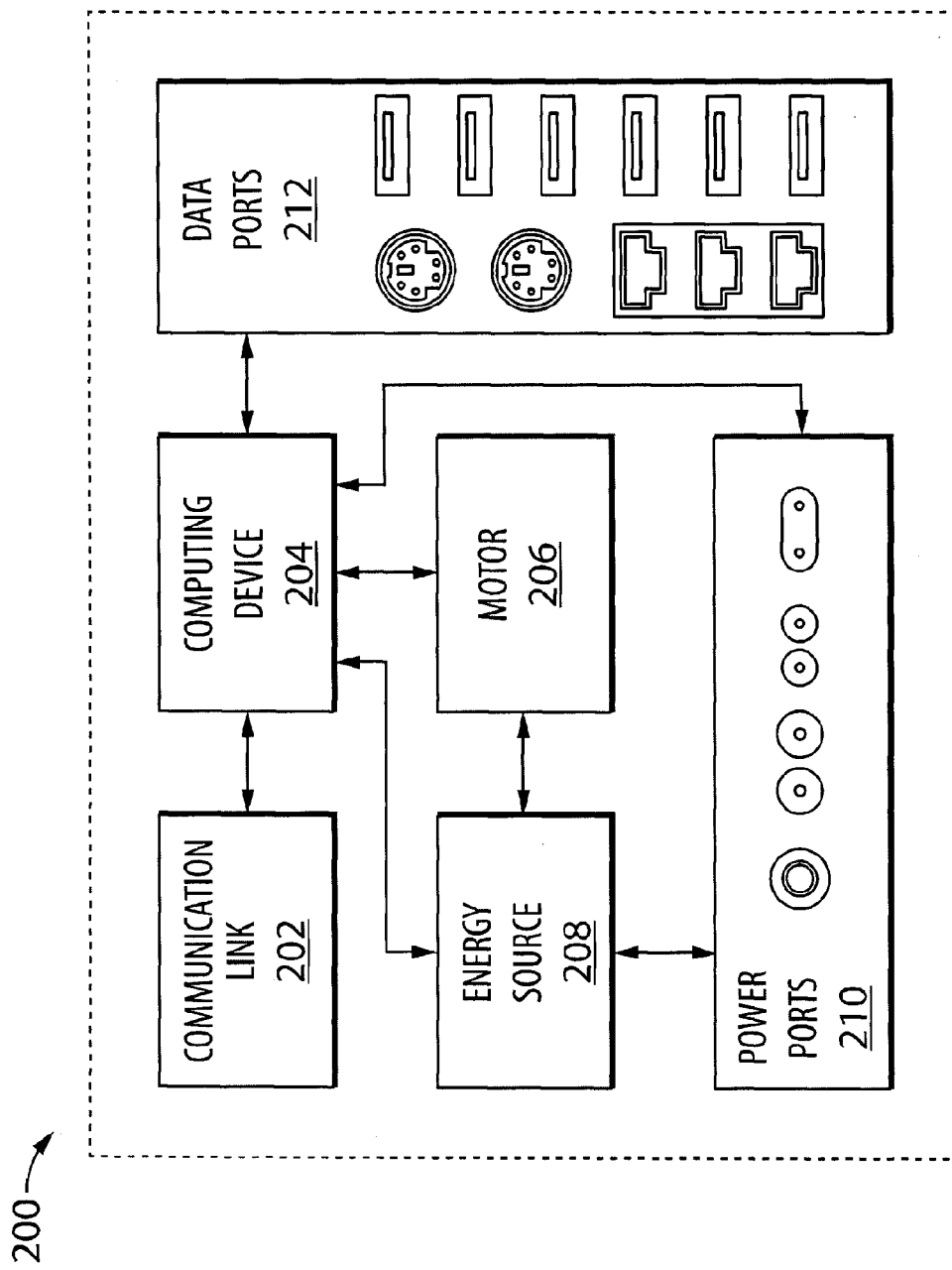
FIG. 1 is a block diagram illustrating the main components of a CIED platform in accordance with an embodiment.

FIG. 1 is a block diagram illustrating the main components of a CIED platform in accordance with an embodiment. As shown in FIG. 1, a CIED platform 200 may include a communication link 202, a computing device 204, a motor 206, a power source 208, power ports 210, and data ports 212. The communication link 202 is operably connected to the computing device 204 for receiving and transmitting data from and to a remote base (not shown). The computing device 204 and the motor 206 may be powered by the power source 208. Alternatively, the power source 208 may include more than one power sources; e.g., one for the computing device 204, one for the motor 206 and one for the power ports 210, or any combination thereof. The power source 208 may include one or more of: a battery, a solar panel, an internal combustion engine, etc.

Although not shown, the motor 206 may include more than one motor; i.e., one or more motors for driving the locomotion system and a motor for driving the steering mechanism.

Figure 2:
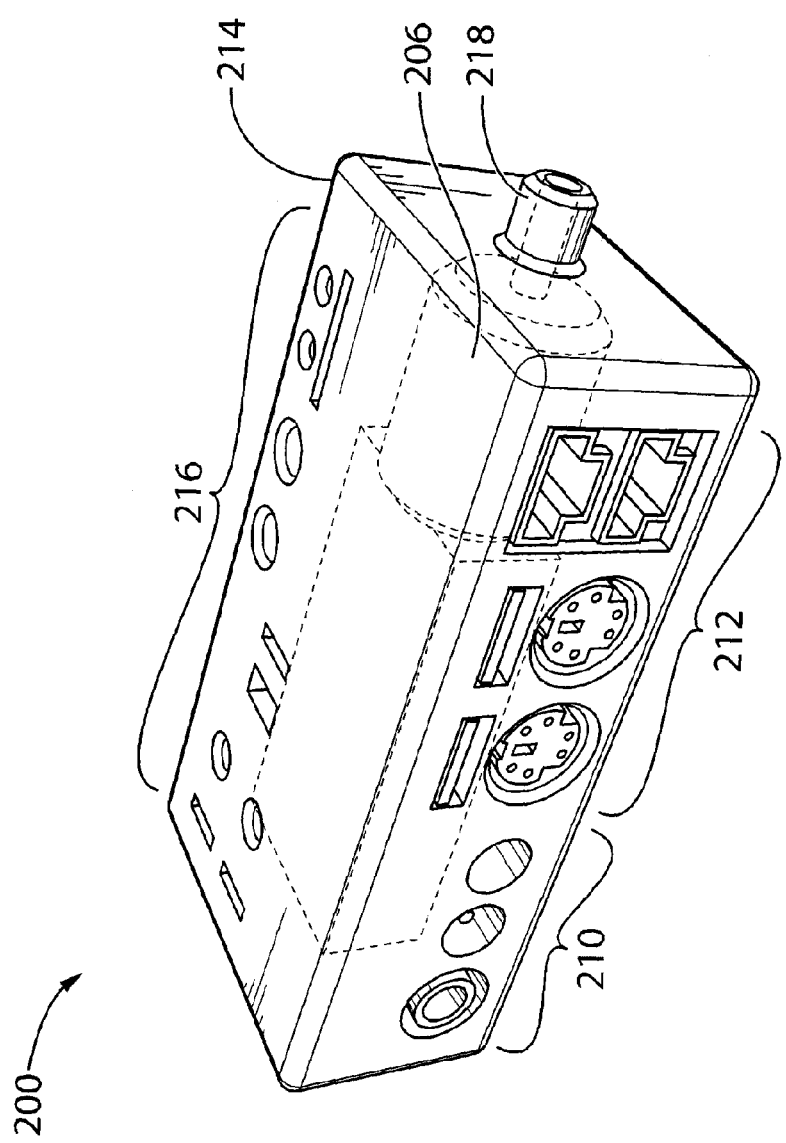
FIG. 2 is a perspective view of an adaptive platform provided in a chassis, in accordance with an embodiment.

The motor 206 may be operably connected to a rotation shaft (see item 218, FIG. 2). In an embodiment, the rotation speed of the motor 206 may be controlled by the computing device 204 based on instructions received via the communication link 202 from the remote base. In addition to the processing capacity used controlling the speed of the motor 206 and the communication with the remote base via the communication link 202, the computing device 204 may have reserved computing capacity dedicated for controlling a plurality of additional devices that may be added in the future as the needs dictate to adapt the platform to evolving IED threats.

According to an embodiment, the computing device 204 comprises a processor core and memory (not shown). The memory is for storing instructions for operating the processor and for storing data. The memory can include Read-Only Memory (ROM) and/or Random-Access Memory (RAM). It may also include a hard disk drive (HDD) and/or a solid-state drive (SSD).

Accordingly, a plurality of data ports 212 may be provided for connecting the additional devices to the computing device 204. The data ports 212 may include a plurality of ports of different kinds. For example, the data ports may include USB ports, PS/2 ports, Ethernet ports, CANbus ports, GIGA Ethernet ports, RS-232, RS-234, RS-488, IEEE 1394 Firewire ports, VGA ports, SVGA ports and other ports as requirements dictate. In an embodiment, the computing device may also have wireless ports for connecting to devices which are equipped with such technology. Examples of wireless ports may include Bluetooth ports, Infrared ports, wireless Ethernet ports, MiWi ports, Zigbee ports, wireless mesh network ports, and others as requirements dictate.

Examples of additional devices that may be added to the CIED robot include: capture device(s) in any available frequency range (e.g., visible or invisible light, sound, ultrasound, X-ray, etc.), light, bomb sniffer, automated rifle and/or rocket launcher, explosives connected to a self-destructing module, explosive sniffer, radar, auxiliary processor, auxiliary memory, sensors, actuators, lamps, robotic manipulators with end-effectors, detonators, stand-off neutralizer, grappling hook, dozer blade, communication re-broadcaster, telecommunication antenna(s), ammunition carrier, trailer, communication cable spooler, trailer hitch, motion detector, power source for powering the one or more devices; (e.g., solar panels), and others as requirements dictate.

Some devices are powered from the computer through the data port, e.g., cameras, pointing devices, etc. and it would suffice to plug them into the corresponding data port to have them up and running. However, to accommodate for devices which require separate powering and devices which do not require a data port, e.g., light projectors, a plurality of power ports 210 of different types may be provided for powering the additional devices. In an embodiment, one or more power ports 210 may be connected to the computing device 204 for selectively switching the power on or off based on instructions received from the remote base (or an interior algorithm or intelligence module) or an input device connected to the computing device, e.g., mouse, keyboard, touchscreen, etc. For example, if the CIED robot includes a light projector, it would be necessary to remotely turn the projector off when not needed for extending battery life, or when the CIED robot is moving in the dark in an area where it may be detected by the enemy.

In a further embodiment, it is possible to remotely control the current provided at one or more power ports via the communication device for accommodating for devices having different power requirements, e.g., when voltage required for one device may be higher than the voltage required for another device.

Driver programs for the additional devices that require such software may be installed in a variety of manners. In one embodiment, the driver program may be transmitted from the remote base via the communication link 202 and installed on the computing device 204. In another embodiment, the program may be provided in a USB key or other means that may be inserted in one of the USB ports to run the program on the computing device, e.g., using auto run. Other methods are also possible which are known in the art.

Accordingly, additional devices may be added to the CIED platform in a plug and play manner, in order to quickly adapt the CIED robot to the evolving environment in which the tasks are to be performed, and without re-designing the entire CIED robot to adapt it to the new threats.

Elements of the platform 200 may be provided on a casing, a chassis and/or a body. The casing/chassis/body may include a plurality of openings/cutouts of different shapes and sizes for receiving the elements of the platform 200 and the additional devices thereon using mechanical connectors. The mechanical connectors may include standard connectors, e.g., nuts and bolts, clamps, brackets, and connectors which are specific to certain applications/devices. Examples of specific connectors include: military mounting brackets, Picatinny Arsenal mounting rails, Weaver mounting rails, MIL-STD-1913 rails, etc.

FIG. 2 illustrates an example of an adaptive platform provided in a casing, in accordance with an embodiment. As shown in FIG. 2, the platform 200 includes a casing 214, a plurality of openings/connectors 216 provided on the casing 214, a motor 206 with a rotation shaft coupling 218, data ports 212, power ports 210 and other elements which are not shown such as the computing device, communication link, power source etc. As discussed above, one or more power ports 210 may be connected to the computing device for selectively switching the power on or off, and/or controlling the power current of these ports based on instructions received from the remote base (or an interior algorithm or intelligence module). In a non-limiting example of implementation, the power ports may be pre-numbered whereby it is possible to remotely control the power at a certain port by setting the current and voltage at the desired levels, in order to accommodate for different devices having different power requirements.

The platform 200 may be installed on a vehicle chassis and/or a body also known as the primary mover in order to displace the CIED robot in and out of the field for performing tasks. In addition to receiving additional devices which were not chosen as part of the original design, the platform 200 may be configured to run different types of primary movers to form unmanned vehicles that move in different physical environments as the needs dictate. In other words, the platform 200 may be adapted to run different types of vehicles, e.g., ground vehicle, boat, airplane, submarine by installing the platform in a different vehicle chassis and/or a body.

This implementation is particularly useful when the prime mover in which the platform is installed can no longer reach the desired place to perform the required task. For example, consider the case where the platform is installed in a ground vehicle to visually monitor a given target. If the target moves to an area where the ground vehicle can no longer reach or have a direct line of sight thereof, the platform may be installed in a vehicle chassis and/or a body of a different or adapted type, e.g., airplane, boat, submarine, etc. to perform the task from the air or from the water or from a vehicle chassis and/or a body that is simply better adapted to the terrain or environment.

The vehicle chassis and/or a body may include controllable steering mechanism, and a locomotion system. Of course, the locomotion system is highly dependent on the operating environment. On the ground, wheels, tracks or crawling devices (imitating snakes) will form part of the locomotion system. In the air and on or in water, propellers or turbines will form part of the locomotion system.

According to an embodiment, the locomotion system comprises a transmission connected to wheels/tracks. The transmission is for connecting to the rotation shaft coupling 218 of the motor 206. The steering mechanism may be powered and/or controlled by the platform using one or more of the power and data ports e.g. by plugging a cable in the corresponding power/data ports. The wheels/tracks and steering mechanism may differ between a vehicle and another.

The wheels/tracks may also be used for steering using one of the steering mechanisms that are known in the art. For example, the steering mechanisms may be used to change the direction of one or more of the wheels, or apply a breaking force on one or more wheels and/or acceleration force on one or more opposite wheels. Similar techniques may be used for the tracks.

According to another embodiment, the motor 206 can form part of, or be installed on or in, the vehicle chassis; i.e., not within the platform. In such a case, another power source (not shown) for the motor can be also on or in the chassis. Alternatively, the motor can be connected to one of the power ports 210 and the power source 208 can be used to feed the motor.

Figure 3A:
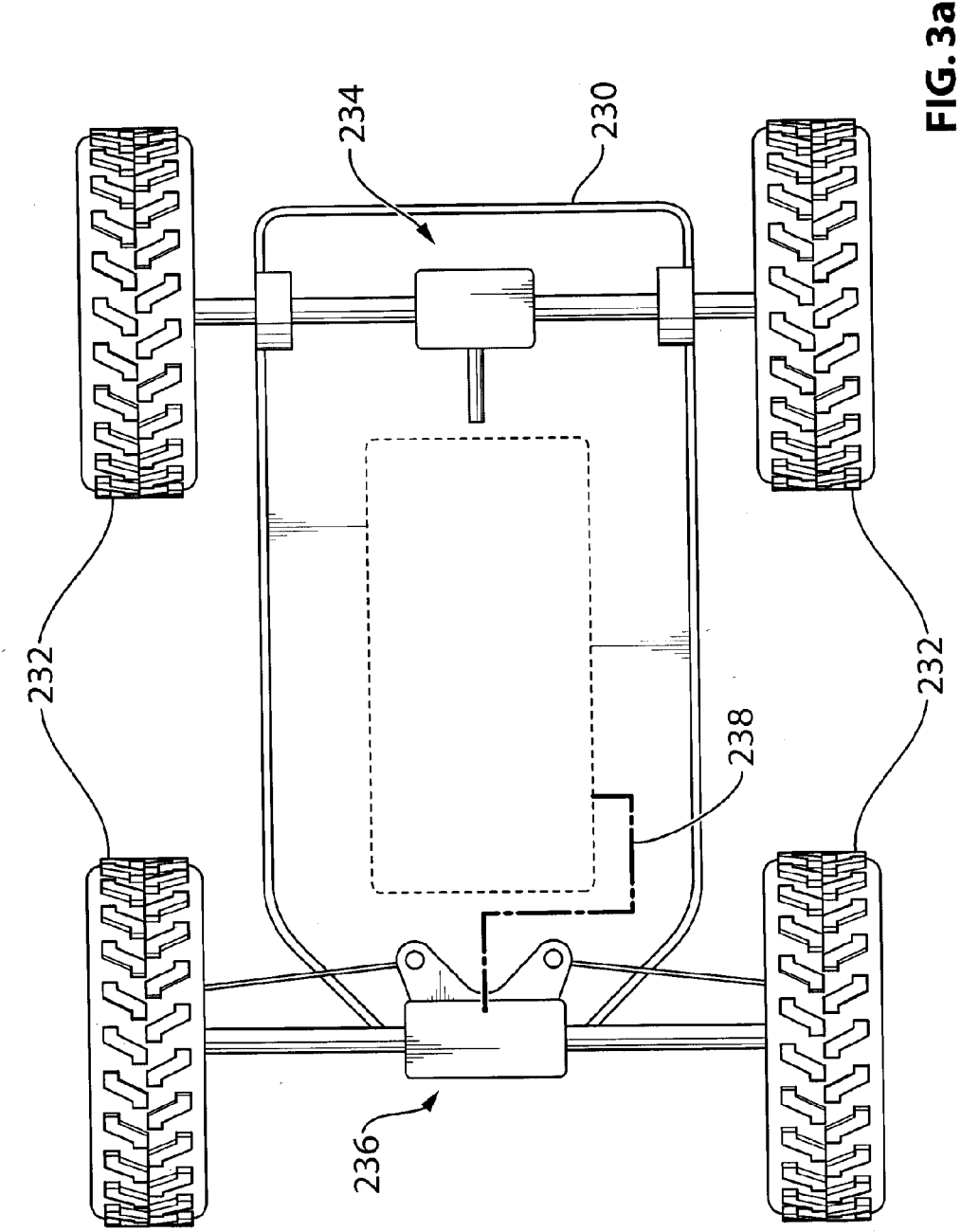
FIG. 3a is a top plan view of a ground vehicle casing for receiving the platform therein according to an embodiment.
Figure 3B:
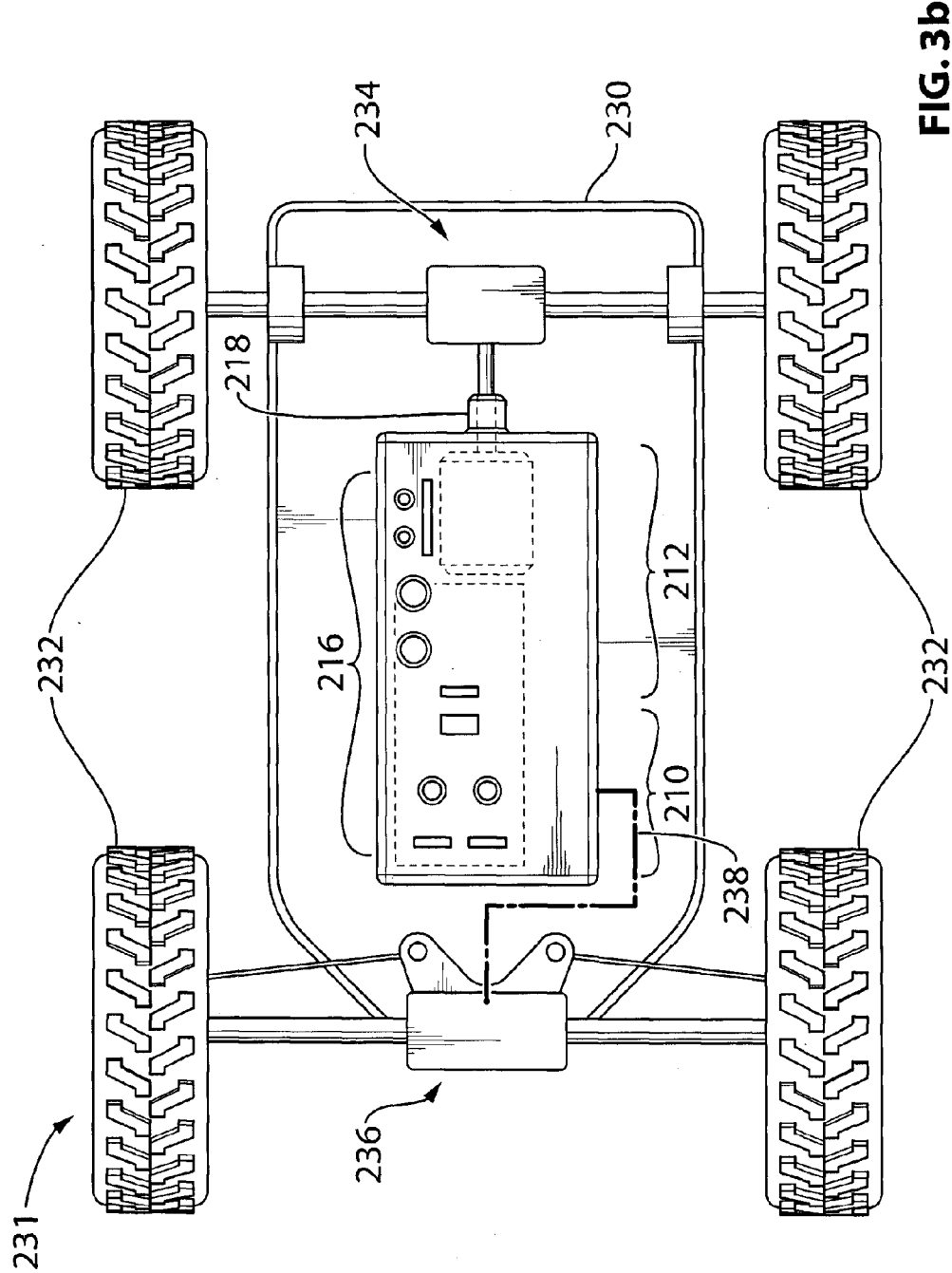
FIG. 3b is a top plan view of a ground vehicle comprising the vehicle casing of FIG. 3a with the platform installed therein.

FIG. 3a illustrates an example of a ground vehicle chassis for receiving the platform 200 therein, and FIG. 3b illustrates a ground vehicle comprising the vehicle chassis of FIG. 3a with the platform installed therein. As shown in FIG. 3a, the vehicle chassis 230 of the ground vehicle comprises a set of wheels 232, a transmission 234, and controllable steering mechanism 236 for steering the unmanned ground vehicle 231 in the desired direction. The controllable steering mechanism 236 may be activated/operated using a control/power cable 238 for plugging into the power and/or data ports of the platform. As shown in FIG. 3b, the platform 200 may be installed in the vehicle chassis 230 in a plug and play manner to form an unmanned ground vehicle 231. In an embodiment, the rotation shaft coupling 218 may be readily connected to the transmission 234 and the steering mechanism 236 may be activated by plugging a control/power cable 238 into the power and data ports of the platform. Whereby, a remotely controllable unmanned ground vehicle 231 may be obtained which may be adapted to evolving threats, as the needs dictate.

Figure 4A:
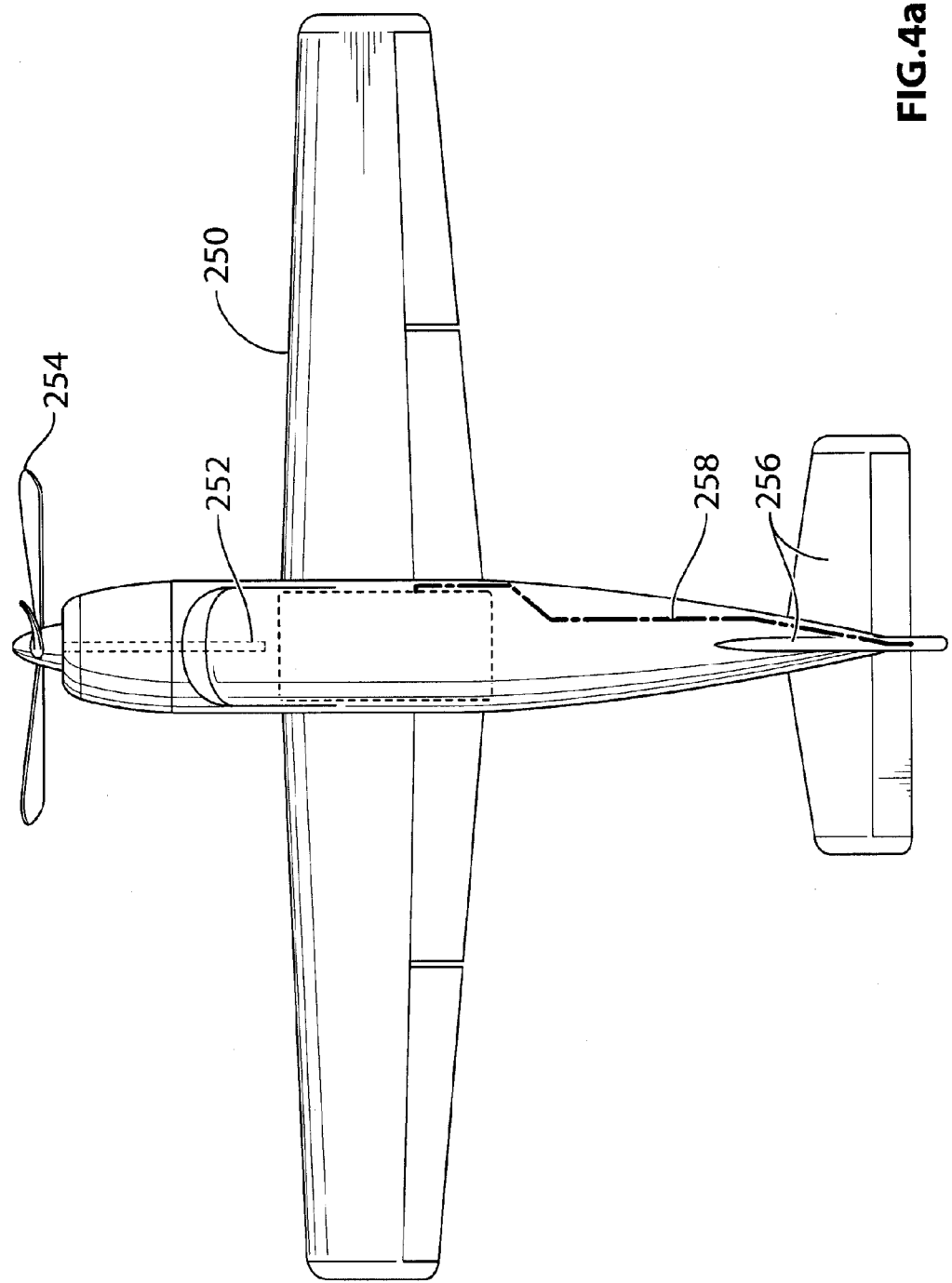
FIG. 4a is a top plan view of a vehicle casing of an airplane for receiving the platform therein.
Figure 4B:
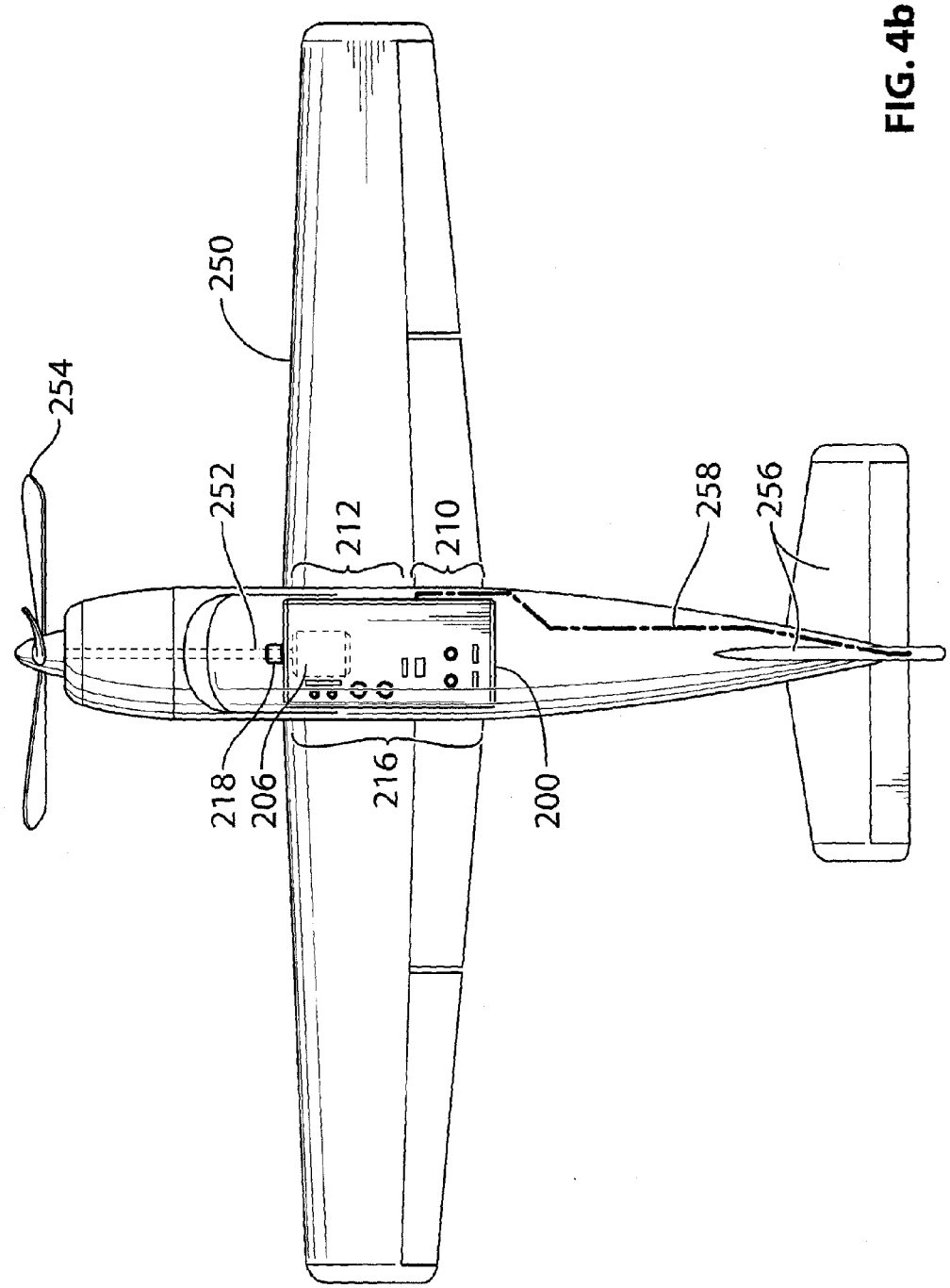
FIG. 4b is a top plan view of an airplane comprising the vehicle casing of FIG. 4a with the platform installed therein.

In an airplane the locomotion system may include blades/propellers, and the steering mechanism may include one or more fins/ailerons/elevators/rudders. An example is shown in FIGS. 4a and 4b. FIG. 4a illustrates an example of a vehicle chassis and body of an airplane for receiving the platform 200 therein, and FIG. 4b illustrates an airplane comprising the vehicle chassis and body of FIG. 4a with the platform installed therein. As shown in FIG. 4a, the vehicle chassis and body 250 of an airplane comprises a transmission 252 connected to a turbine 254, and steering mechanism 256 in the form of fins. The fins may be controlled by the computing device of the platform by plugging the corresponding power and/or data cable 258 into the corresponding connectors in the platform 200. Similar to the previous embodiment, the platform 200 may be installed into the chassis and body 250 in a plug and play manner. In particular, the rotation shaft coupling 218 may be readily connected to the transmission 252 of the airplane and the power and/or data cable 258 of the steering mechanism 256 may be plugged into the corresponding power ports 210 and data ports 212 of the platform for controlling the fins.

Several changes which are known for someone skilled in the art may be effected to this embodiment. For instance, it is possible to provide the turbines under the wings instead of in the front. It is also possible to have steering mechanism in the wings for landing and takeoff purposes etc.

In a boat, the locomotion system may include a turbine for moving the vehicle on the water. The steering mechanism may include one or more fins, rudder or other means which are known in the art. An example is shown in FIGS. 5a and 5b.

FIG. 5a illustrates an example of a vehicle chassis and body of a boat for receiving the platform 200 therein, and FIG. 5b illustrates a boat comprising the vehicle chassis and body of FIG. 5a with the platform installed therein. As shown in FIG.

5a, the vehicle chassis and body 270 of a boat includes a transmission 272 connected to a turbine for moving the boat in the water, and a fin 276 provided with a power/data cable 278 for controlling the fin 276 from the computing device of the platform 200. FIG. 5b illustrates a boat 271 comprising the chassis and body 270 and the platform 200 installed in the chassis and body 270 in a plug and play manner. As shown in FIG. 5b the power/data cable 278 is connected to the platform 200 and the transmission 272 is connected to the motor 206 of the platform 200.

Figure 6A:
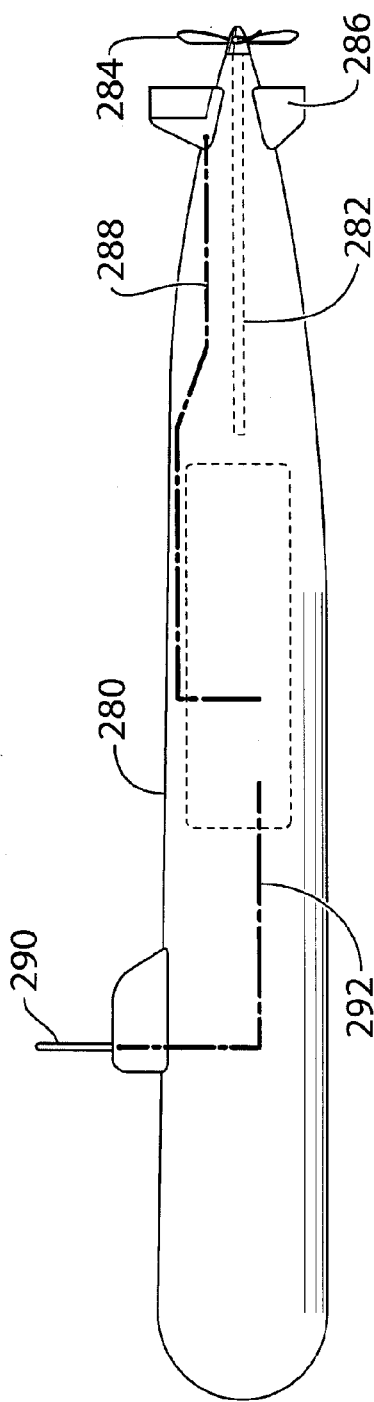
FIG. 6a is a side plan view of a vehicle casing of a submarine for receiving the platform therein.
Figure 6B:
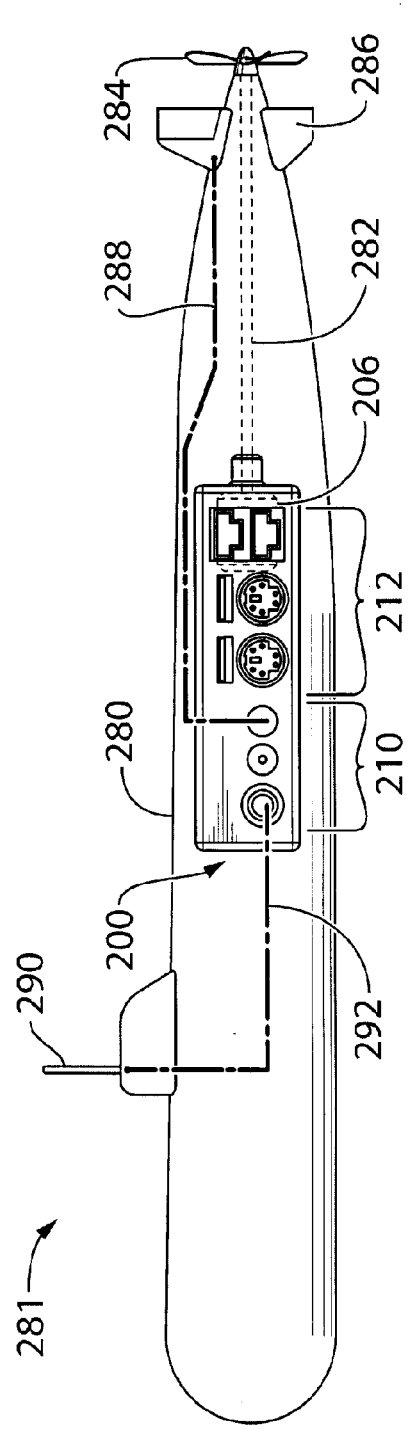
FIG. 6b is a side plan view of a submarine comprising the vehicle casing of FIG. 6a with the platform installed therein.

FIG. 6a illustrates an example of a vehicle chassis and body of a submarine for receiving the platform 200 therein, and FIG. 6b illustrates a submarine comprising the vehicle chassis and body of FIG. 6a with the platform installed therein. FIG. 6a shows a chassis and body 280 for a submarine. The chassis and body 280 comprises a transmission 282 connected to a turbine 284, and steering mechanism in the form of fins 286 which may be controlled/activated using a cable 288 for plugging into the power ports 210 and data ports 212 of the platform 200. FIG. 6b illustrates an unmanned submarine 281 comprising the chassis and body 280 and the platform 200 installed therein. As shown in FIG. 6b, the motor 206 of the platform 200 is connected to the transmission 282, and the cable 288 of the fins 286 is connected to the corresponding power ports 210 and/or data ports 212.

In order to control and communicate with the unmanned submarine 281 in the water, the vehicle chassis and body may include a sonar transceiver 290 which may connected to the platform using a cable 292, as shown in FIGS. 6a and 6b. Alternatively, it is possible to provide the sonar transceiver in the communication link 202 provided in the platform 200.

As discussed above, the rotation speed of the motor 206, and consequently the speed of the locomotion system, is controlled by the computing device based on instructions received by the communication link 202 in order to remotely control the speed of the vehicle and to adapt to the different types of vehicles. Similarly, the steering mechanism may also be controllable by the computing device 204 based on instructions received through the communication link 202. In an embodiment, the vehicle chassis and body may be provided with one or more plugs which may be inserted in the corresponding data ports 212 and power ports 210 in a plug and play manner, as described above.

When necessary the vehicle chassis and body may also include an auxiliary and/or external communication link that may also be plugged into the computing device 204 in a plug a play manner such as in the case of the submarine.

In an embodiment, the platform 200 and one or more of the different vehicle chassis and bodies and/or one or more of the additional devices may be provided in a kit whereby the user may install the platform in the vehicle chassis and body that is appropriate for a specific task. As discussed above, if the environment evolves and the unmanned vehicle can no longer perform the required task, the platform may be installed in a different chassis and body to perform the task from a different physical environment; i.e., above the water, under the water, in the air, on the ground, etc. Additionally, as the environment evolves, the devices may be added or removed in accordance with the requirements of each task that need to be performed. Depending on the needs, the kit may also include standard and specific mechanical connectors for mounting the additional devices to the platform, and additional devices such as those discussed above.

Figure 7A:
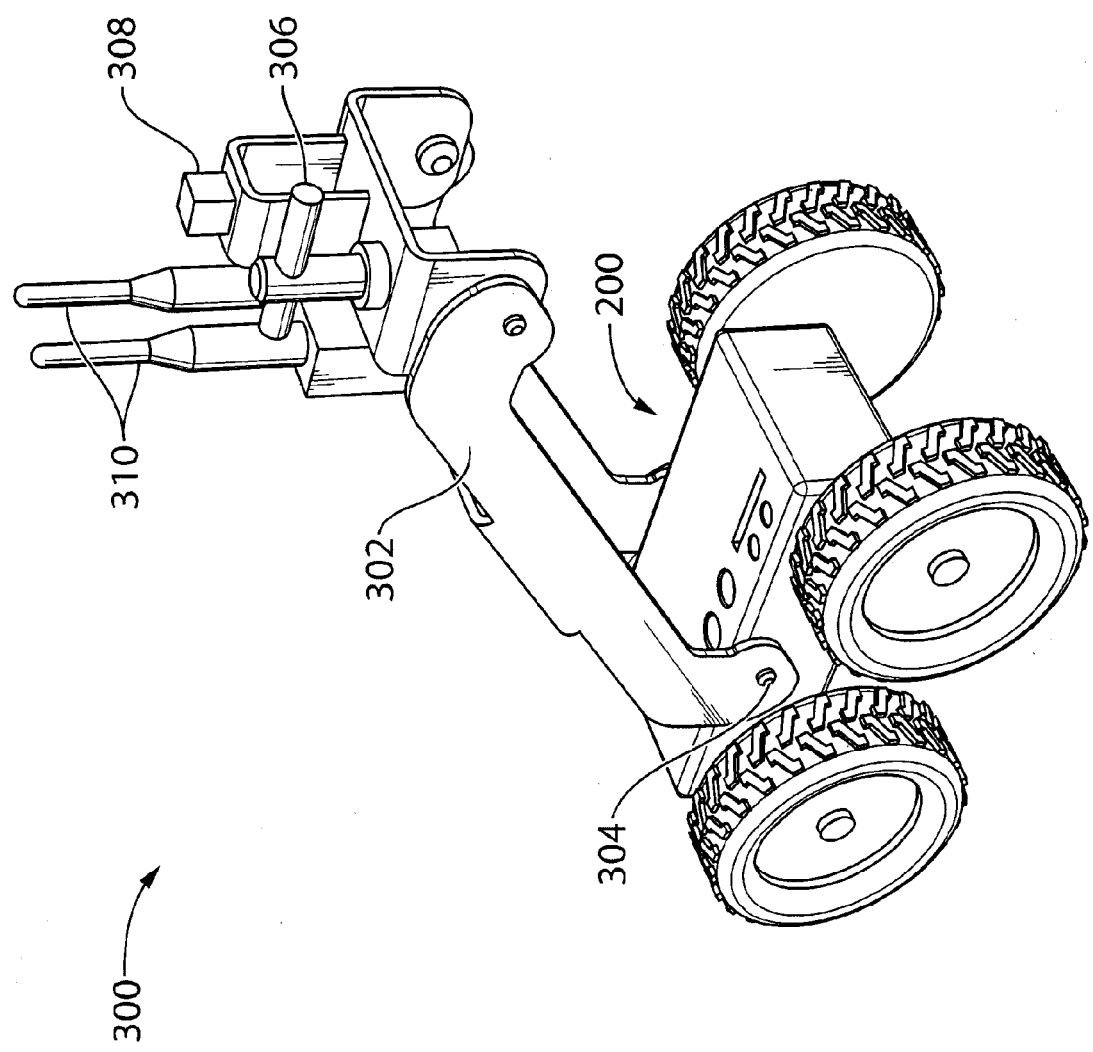
FIGS. 7a and 7b are perspective views showing an example of an evolving unmanned ground vehicle.
Figure 7B:
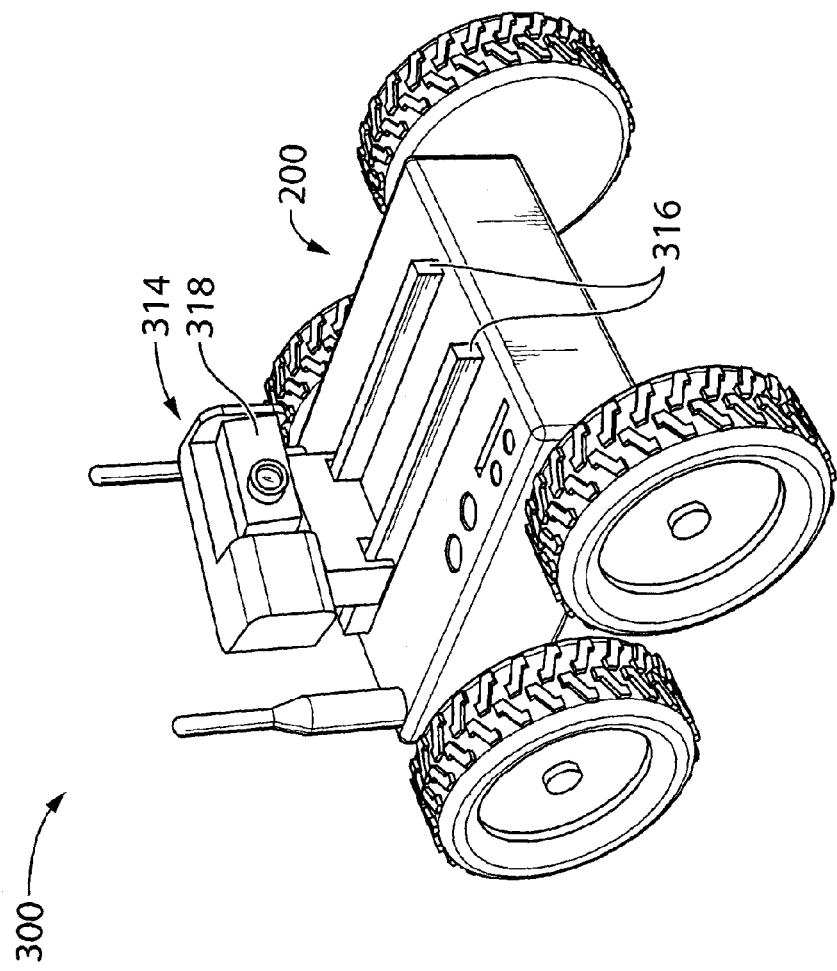

FIGS. 7a and 7b illustrate an example of an evolving unmanned ground vehicle. FIG. 7a illustrates an unmanned vehicle (robot) 300 which may be used for exploring tunnels and underground drainage pipes. The vehicle 300 may include a rotating arm 302 rotatably connected to the platform 200 at pivot points 304 using a motor (not shown). In the example of FIG. 7, the rotating arm 302 comprises a microphone 306, a camera 308 and antennas 310. However, if the need arises to examine cars for explosives the vehicle 300 may require an arm that extends past the chassis of the platform 200 to enter in the car for exploring the interior of the car. FIG. 7b illustrates an evolving version 312 of the vehicle 300. In the vehicle 312, the rotating arm has been removed and replaced with a sliding arm 314 that slides on a set of tracks 316 in order to move forward and backward on the chassis of the platform 200. The camera 308 has also been changed in favor of a pan/tilt camera 318. In this case, the new arm sliding 314 and the new pan/tilt camera 318 may be simply plugged into the corresponding data and power ports inside the platform to be operated in a plug and play manner. Furthermore, mounting of the tracks may be easily done due to the presence of standard openings on the chassis which readily receive the mechanical connectors that secure the tracks to the chassis.

Figure 8:
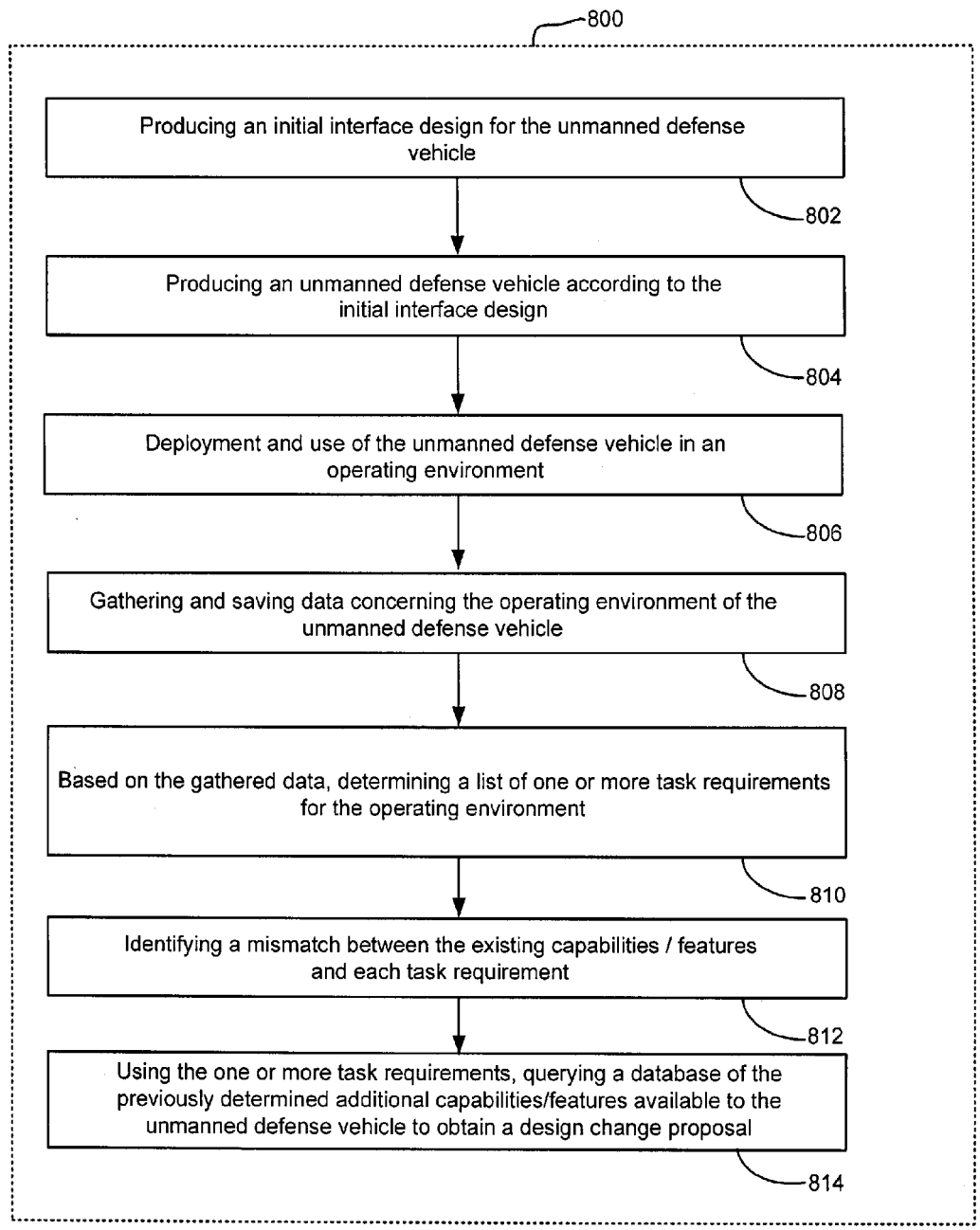
FIG. 8 is a flowchart of a method for producing and modifying an unmanned defense vehicle that can adapt to evolving requirements in view of the evolvinq threats or mission requirements in the operating environment.

Now turning to FIG. 8, there is shown a method 800 for producing and modifying an unmanned defense vehicle that can adapt to evolving requirements in view of the evolving threats or mission requirements in the operating environment. The vehicle is designed and made to accept new devices that were not conceived as part of the original design so that operators and engineers can introduce novel payloads or platform modifications based on the current threat and tactics and hence adapt to perform new tasks in view of the evolution in the operating environments.

The method comprises determining the needs/requirements for the unmanned defense vehicle to operate new devices and what capabilities it must have in its first iteration. This is referred to as the interface design step (step 802). During this step, the list of connectors which will be required is determined. The connectors include, for example, electrical/power ports, data and communication connector, and mounting and mechanical connectors or interfaces. The vehicle is produced (step 804) according to the interface design.

In view of the connectors available on the unmanned defense vehicle, a list of capabilities/features that can later be added to the unmanned defense vehicle can be generated. The list of additional capabilities/features can be stored in a database for later reference. The method may further comprise documenting and preparing an application programmer interface such that new designers, operators, and organizations can add to the existing interface design base. The unmanned defense vehicle is then deployed to the operating environment and used by soldiers/operators (step 806).

The next steps involve altering the design of the unmanned defense vehicle after it is deployed in the operating environment. Accordingly, the method comprises gathering and saving data in memory concerning the operating environment of the unmanned defense vehicle (i.e., the field) (step 808). The data can be gathered by the unmanned defense vehicle itself or by another means such as by a human observer or from a database comprising data about the environment (maps (e.g., road, relief or others), infrastructure data (e.g., buildings, bridges, roads, etc.), weather, types of threats by area, etc.).

Based on the gathered data, a list of one or more task requirements can be determined for the operating environment (step 810). The one or more task requirements can be determined by users/operators of the unmanned defense vehicle in the operating environment. It is also possible to have a computing device determine the task requirements.

The one or more task requirements are forwarded to the person responsible for modifying the design of the unmanned vehicle. This person may be located outside the operating environment. In some instances, the person is located in or near the operating environment.

A comparison of the capabilities/features which exist and are currently embodied on the unmanned defense vehicle with the tasks requirements is then made to confirm, based on the comparison, whether there is a mismatch between the existing capabilities/features and each task requirement (step 812). Optionally, the list of previously existing capabilities/features can be regenerated in case new equipment recently made available can be adapted for addition to the unmanned defense vehicle.

When a mismatch is confirmed (i.e., a task requirement is not met by any feature currently present on the vehicle), a database of the previously determined additional capabilities/features available to the unmanned defense vehicle is queried using the one or more task requirements (step 814). The database of the available capabilities/features is normally outside the operating environment. In some circumstances, it can be within the unmanned defense vehicle, accessed by the unmanned defense vehicle or accessed by or through another device.

The query of database will return one or more design change proposals that will meet the mismatched task requirement(s). Optionally, there can be an evaluation or grading of the importance of the mismatch to determine if the mismatch is important enough to jeopardize the unmanned defense vehicle's mission and hence giving a level of importance to the requirement for a design change.

The application programmer interface is then used to prepare the modification instructions, a test plan and generate the parts list for the design change. Optionally, more than one design change proposal could meet the mismatched task requirement. In such a case, criteria such as price, availability of parts, urgency, number of unmanned defense vehicle to be modified, etc., will be used to select the design change proposal. The test plan will be used by the operator/soldier that the modification works as planned.

The parts from the parts list can be automatically ordered or confirmed by a user. The user will assemble a modification kit and forward it with the instructions for modification of the unmanned defense vehicle and the ordered parts to a user/operator/technician in the field who will follow the instructions to modify the unmanned defense vehicle. Alternatively, the instructions and parts can be sent separately or, in fact, the part can be ordered directly by the user from the operating environment. For example, the ordered parts can be shipped directly to the operating environment. When a plurality of unmanned defense vehicles must be modified, the appropriate number of parts is sent to the appropriate location(s). The same goes for the instructions and parts list.

Finally, the design changes can be implemented on the unmanned defense vehicle. When a software design change is involved, then the software can be automatically downloaded and configured (e.g., wirelessly) in the unmanned defense vehicle's memory (e.g., its hard drive or Random Access Memory (RAM)). Alternatively, a user can connect in a wired manner to the platform and download and configure the new software. When hardware is involved the user will install, connect and test the ordered parts according to the modifications instructions. The unmanned defense vehicle will then be ready for deployment with its enhanced mission capability and for further modifications as the changing operating environment dictates.

This capability for design review after the unmanned defense vehicle is deployed to the operating environment must be thought out well in advance; i.e., during the original design cycle, in order to provide sufficient flexibility in the basic components which are in the original design of the unmanned defense vehicle. The basic components are those which form the kit for building an adaptive unmanned defense vehicle which is described herein.

While embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A kit for building an adaptive unmanned defense vehicle (vehicle), the kit comprising:
   a vehicle chassis comprising a locomotion system for moving the vehicle in an operating environment, and a controllable steering mechanism for steering the vehicle as it moves in the operating environment;
   one or more motors for coupling to the locomotion system and to the controllable steering mechanism;
   a remote control unit for communication with and for controlling the one or more motors and consequently the locomotion system and the controllable steering mechanism;
   payload devices for performing tasks attributed to the vehicle; and
   a platform for adapting the vehicle in-situ to perform new tasks in view of evolution in the operating environment, the platform comprising:
      a casing for mounting on or in the vehicle chassis;
      a computing device for connection to existing payload devices from the payload devices, the computing device comprising a processor and a memory, the memory for storing computing instructions for controlling operation of the existing payload devices, the processor having unused processing capacity and the memory having unused storage space for controlling operation of additional payload devices other than the existing payload devices;
      a power source for powering at least one of the payload devices;
      power ports connected to the power source; and
      data ports connected to the computing device for connecting at least one of the payload devices to the computing device;
   wherein the computing device, the power source, the power ports and the data ports are mounted to the casing and wherein the payload devices and the one or more motors are for mounting to either the vehicle chassis or the casing.

2. The kit of claim 1, wherein the payload devices are plug and play devices.

3. The kit of claim 1, further comprising a transceiver for establishing a communication link with a remote base for at least one of:
   transmitting data gathered by either one of the payload devices;
   receiving and installing upgrading/driver software for at least one of the computing device and the payload devices; and
   receiving instructions for execution by the computing device to enable and disable one or more of the payload devices.

4. The kit of claim 1, wherein the memory is further for storing data gathered by either one of the payload devices.

5. The kit of claim 1, further comprising a plurality of vehicle chassis of different types for building different types of vehicles as needed using a single platform, the vehicle chassis being adapted to receive and be operated by the platform in a plug and play manner.

6. The kit of claim 5, wherein the plurality of vehicle chassis comprise at least two of:
- a chassis for a ground vehicle, the locomotion system comprises a set of wheels or a set of tracks for rollably driving the vehicle on the ground;
- a chassis for an airplane, the locomotion system comprising at least one turbine or blade for moving the airplane in the air;
- a chassis for a boat, the locomotion system comprising at least one turbine for moving the boat on water; and
- a chassis for a submarine comprising a sonar transceiver for connecting to the computing device, the locomotion system comprises at least one turbine for moving the submarine in the water.

7. The kit of claim 1, wherein the power source includes one or more of: a battery, an internal combustion engine, and a solar panel.

8. The kit of claim 1, further comprising mechanical connectors on one or both of the vehicle chassis and the casing, the mechanical connectors shaped and dimensioned to provide a connection interface for the payload devices.

9. The kit of claim 1, wherein the platform includes mechanical connectors comprising military mounting brackets, Picatinny Arsenal mounting rails, Weaver mounting rails, and MIL-STD-1913 rails.

10. The kit of claim 1, wherein the data ports comprise wired data ports comprising one or more of: USB ports, PS/2 ports, Ethernet ports, CANbus ports, GIGA Ethernet ports, RS-232, RS-234, RS-488, IEEE 1394 Firewire ports, HDMI ports, VGA ports, and SVGA ports.

11. The kit of claim 1, wherein the data ports comprise one or more wireless ports comprising Bluetooth ports, Infrared ports, wireless Ethernet ports, MiWi ports, Zigbee ports, and wireless mesh network ports.

12. The kit of claim 1, wherein the payload devices include one or more of: capture device(s), lamp, bomb sniffer, automated rifle and/or rocket launcher, explosives connected to a self-destructing module, explosive sniffer, radar, auxiliary processor, auxiliary memory, sensors, actuators, lamps, robotic manipulators with end-effectors, detonators, stand-off neutralizer, grappling hook, dozer blade, communication re-broadcaster, ammunition carrier, trailer, communication cable spooler, trailer hitch, and motion detector.

13. The kit of claim 1, wherein the remote control unit is wired or wireless.

14. A platform for mounting to a vehicle chassis forming part of an adaptive unmanned defense vehicle, the platform for adapting the vehicle in-situ to perform new tasks in view of evolution in an operating environment, the platform comprising:
- a casing for mounting on or in the vehicle chassis;
- a computing device for connection to existing payload devices, the computing device comprising a processor and a memory, the memory for storing computing instructions for controlling operation of the existing payload devices, the processor having unused processing capacity and the memory having unused storage space for controlling operation of additional payload devices other than the existing payload devices;
- a power source for powering at least one of the payload devices;
- power ports connected to the power source; and
- data ports connected to the computing device for connecting at least one of the payload devices to the computing device;

wherein the computing device, the power source, the power ports and the data ports are mounted to the casing and wherein the payload devices are for mounting to either the vehicle chassis or the casing.

15. A method for countering evolving IED (improvised explosive devices) threats in a battlefield, the method comprising:
- obtaining a vehicle having an initial set of capabilities/features defined by existing payload devices and a platform comprising:
  - mechanical connectors for receiving additional payload devices other than the existing payload devices;
  - a computing device configured to control operation of the additional payload devices;
  - power ports for powering the additional payload devices; and
  - data ports for interfacing the additional payload devices with the computing device for controlling operation of the additional payload devices;
- gathering data on the operating environment, including detecting a new task requirement for a new threat;
- using the gathered data, modifying the vehicle to counter the new threat in-situ, the modifying including mounting an additional payload device onto the platform and connecting the additional payload device to the computing device using a data port.

16. The method of claim 15, wherein gathering data on the operating environment comprises using the vehicle in the operating environment and taking a photo or a video footage of the operating environment using a camera.

17. The method of claim 16, further comprising uninstalling the platform from a first type of chassis for a first physical environment and installing the platform, in a plug and play manner, in a second type of chassis for a second physical environment different than the first physical environment, the first type of chassis and the second type of chassis being one of: a chassis for ground vehicle, a chassis for an airplane, a chassis for a boat, and chassis for a submarine.

18. The method of claim 15, further comprising, upon identifying the new threat, querying a database for a design change proposal and using the design change proposal to modify the vehicle.

19. The method of claim 15, further comprising connecting the additional payload devices to a power port for powering the additional payload device.

* * * * *